Patented May 22, 1923.

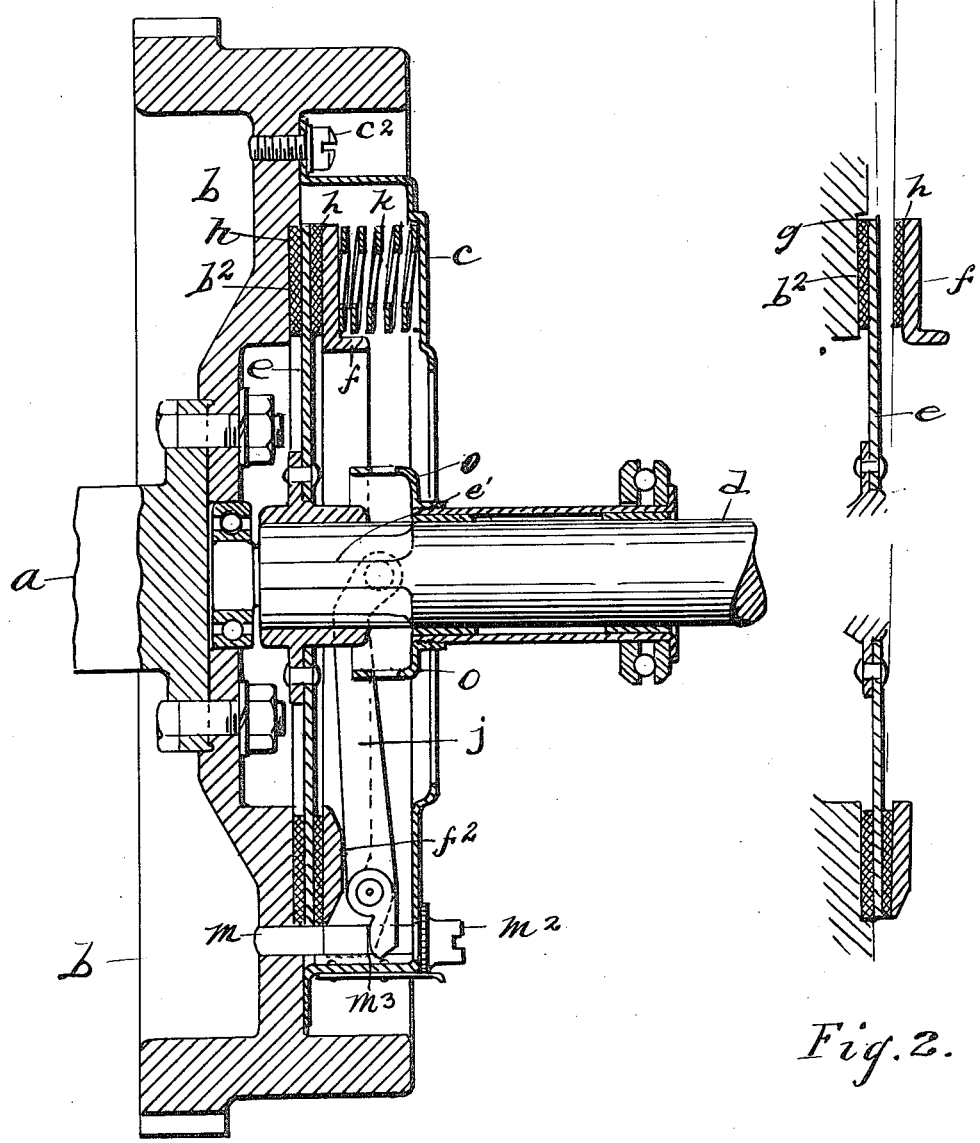

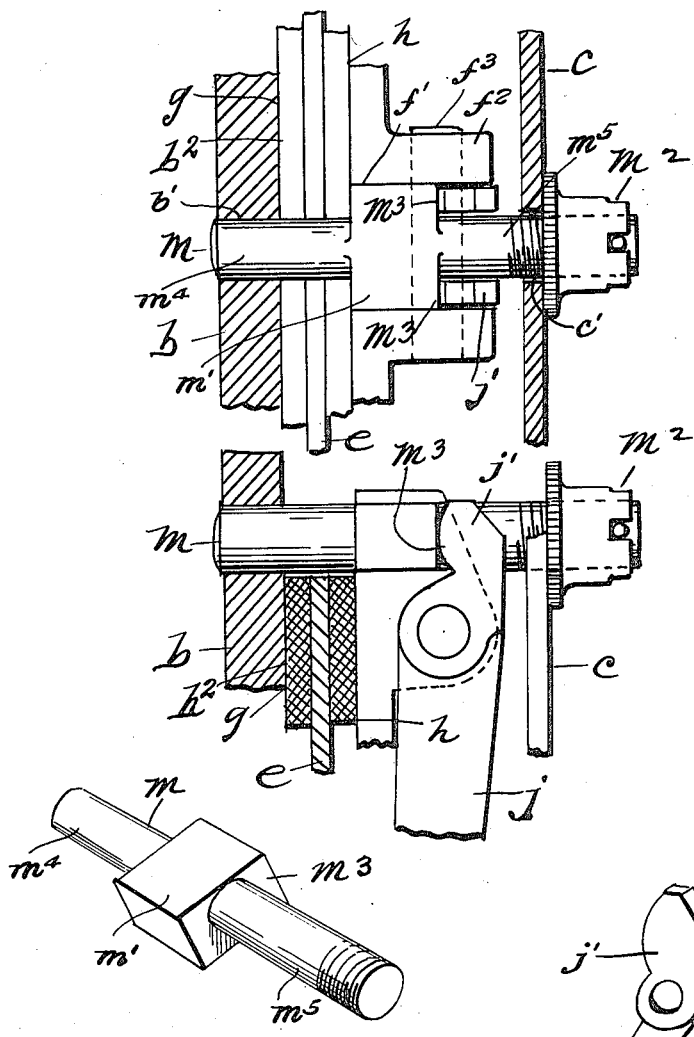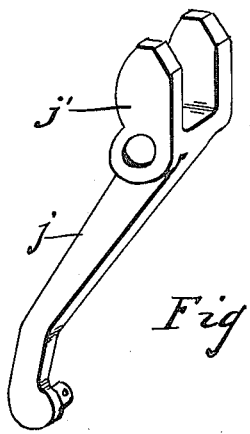

1,455,848

UNITED STATES PATENT OFFICE.

ALFRED MOORHOUSE, OF JACKSON, MICHIGAN, ASSIGNOR TO PACKARD MOTOR CAR COMPANY, OF DETROIT, MICHIGAN, A CORPORATION OF MICHIGAN.

CLUTCH.

Application filed September 28, 1917. Serial No. 193,645.

*To all whom it may concern:*

Be it known that I, ALFRED MOORHOUSE, a citizen of the United States, residing at Jackson, county of Jackson, State of Michigan, have invented a certain new and useful Improvement in Clutches, and declare the following to be a full, clear, and exact description of the same, such as will enable others skilled in the art to which it pertains to make and use the same, reference being had to the accompanying drawings, which form a part of this specification.

This invention relates to clutches and particularly to the plate type of clutches such as are in general use in the transmission mechanism of motor vehicles.

One of the objects of the invention is to provide an improved construction in clutches.

Other objects of the invention will appear from the following description taken in connection with the drawings, which form a part of this specification, and in which:

Fig. 1 is a sectional view of a clutch embodying the invention, together with so much of the transmission mechanism as is necessary to illustrate the relationship of the parts;

Fig. 2 is a somewhat diagrammatic view illustrating the action of the clutch pressure plate;

Fig. 3 is a detached perspective view of the driving and adjusting pin;

Fig. 4 is a detached perspective view of one of the clutch operating levers;

Fig. 5 is a detail view partly in section showing the parts adjacent to the adjusting and driving pin; and Fig. 6 is a view of the parts shown in Fig. 5, looking from a point located 90° from that of Fig. 5.

Referring to the drawings $a$ represents a motor crank shaft and $b$ is the fly wheel thereon. The fly wheel $b$ and an annular housing $c$ which is secured thereto as by screws $c^2$, constitute the two elements of the clutch driving member. The part $c$ is separated from the web of the fly wheel $b$ thus forming a housing for the other clutch parts.

The transmission or driven shaft of the vehicle is represented at $d$ and $e$ is a driving plate splined upon the transmission shaft $d$ as shown at $e'$, thus permitting longitudinal movement of the plate but causing the plate and shaft $d$ to turn together.

A pressure plate $f$ is arranged in the housing adjacent the plate $e$ and several springs $k$ are uniformly distributed around the pressure plate $f$ and act against the housing plate $c$ to cause frictional engagement between the plate $e$, the web of the fly wheel $b$, and the pressure plate $f$, thus causing the driving and driven elements to turn together. Between the plate $e$ and the web of the fly wheel and the face of the pressure plate there are frictional washers $h$ of suitable material for taking the wear between the parts.

The pressure plate $f$ is formed with several recesses $f'$ and at the sides of each of these recesses are standards $f^2$ in which are pivot pins $f^3$ for the operating levers $j$.

There is a driving pin $m$ for each of the recesses $f'$ in the pressure plate $f$ and these pins are each formed with an enlarged middle portion $m'$ and end portions $m^4$ and $m^5$. The end portion $m^4$ extends into an opening $b'$ in the web of the fly wheel $b$ and the end portion $m^5$ extends into a corresponding opening $c'$ in the driving element $c$. The latter end is threaded and a nut $m^2$ provides a longitudinal adjustment for the pin $m$.

The middle enlarged portion $m'$ of each of the pins is adapted to fit in a recess $f'$ of the pressure plate so that the pin forms a key which causes the pressure plate to turn with the driving elements while at the same time permitting the pressure plate to move axially of the driving and driven shafts.

The enlarged portion $m'$ of each of the pins $m$ also forms shoulders $m^3$ which are engaged by the outer forked end $j'$ of the lever $j$. The inner ends of the levers $j$ engage a sleeve $o$ which is slidable concentric with the shaft $d$.

In the operation of the clutch the springs $k$ will yieldingly retain the pressure plate in engagement with the plate $e$ and the latter in engagement with the fly wheel web, through the friction washers, of course, and this engagement may be relieved by moving the sleeve $o$ towards the right in Fig. 1 or away from the fly wheel. Each of the levers $j$ will thus act to move the pressure plate $f$ against the action of the springs and thus disengage the clutch.

The nuts $m^2$ may be operated to properly adjust the various pins $m$ and if desired these pins may be so adjusted that the pressure plate $f$ is in a plane at an angle to the plane of the plate e, as shown in Fig. 2, so that all of the pressure plate will not engage at one time but rather the engagement of the plate will be a gradual one.

Other forms of the invention may be made without departing from the spirit or scope thereof.

Having thus described my invention, what I claim and desire to secure by Letters Patent is:

1. In a clutch, the combination with a driving member having separated elements, a driven element, and a pressure plate arranged between the driving elements, of a pin extending into both of the driving elements and having a part engaging the pressure plate to key it to the driving member, said pin being adjustable in the driving elements, spring means acting to engage the pressure plate and driven element, and a lever operating on the pin to relieve the engagement.

2. In a clutch, the combination with a driving member having separated elements, a driven element, and a pressure plate arranged between the driving elements, of an axially disposed pin having its ends extending into the driving elements and having an intermediate part to support the pressure plate in axially slidable relation and thereby rotate the latter with the driving elements, spring means to engage the pressure plate and driven element, and a lever fulcrumed on said intermediate part of the pin to move the pressure plate against the action of said spring means.

3. In a clutch, the combination with a driving member having separated elements, a driven element, and a pressure plate arranged between the driving elements and having spring means for engaging it with the driven element, of a pin having its ends extending into the driving elements and having an enlarged intermediate part adapted to engage the pressure plate and forming a shoulder, and a lever pivoted to the pressure plate and having a part engaging said shoulder to relieve the clutch.

In testimony whereof, I sign this specification.

ALFRED MOORHOUSE.